United States Patent [19]

Kelm et al.

[11] Patent Number: 4,909,684
[45] Date of Patent: * Mar. 20, 1990

[54] RETENTION KNOB FOR A TOOL HOLDER AND CUTTING TOOLS EMPLOYING THE SAME

[75] Inventors: Walter H. Kelm, Mt. Clemens; Paul W. Newland, Warren, both of Mich.

[73] Assignee: Carboloy Inc., Warren, Mich.

[*] Notice: The portion of the term of this patent subsequent to Feb. 9, 2005 has been disclaimed.

[21] Appl. No.: 212,200

[22] Filed: Jun. 27, 1988

[51] Int. Cl.$^4$ .............................................. B23C 5/26
[52] U.S. Cl. ................................. 409/234; 409/232; 279/89; 279/1 TS
[58] Field of Search ............ 409/232, 234; 279/1 TS, 279/89, 81, 1 A, 1 B, 93, 94; 82/36 B; 408/239 A, 239 R, 240

[56] References Cited

U.S. PATENT DOCUMENTS

| | | | |
|---|---|---|---|
| 1,433,527 | 10/1922 | Browand | 279/81 |
| 2,815,688 | 12/1957 | Forbes et al. | 408/57 |
| 4,575,293 | 3/1986 | Berti | 409/234 |
| 4,723,878 | 2/1988 | Kelm et al. | 409/234 |

Primary Examiner—Z. R. Bilinsky
Assistant Examiner—R. S. Schultz
Attorney, Agent, or Firm—Hedman, Gibson, Costigan & Hoare

[57] ABSTRACT

A retention knob for reversibly locking a tool holder to a locking device in which the shaft of the retention knob has a pair of opposed recesses separated by non-recessed portions to thereby provide a significantly stronger locking engagement between the tool holder and the locking device. Also disclosed are cutting tool assemblies employing the retention knob.

11 Claims, 2 Drawing Sheets

RETENTION KNOB FOR A TOOL HOLDER AND CUTTING TOOLS EMPLOYING THE SAME

FIELD OF THE INVENTION

The present invention is generally directed to an improved retention knob for reversibly locking a tool holder to a locking device and to cutting tool assemblies employing the same in which the retention knob has significantly greater strength than previous designs and therefore is less susceptible to fracture resulting from tensile forces applied to the cutting tool during machining operations.

BACKGROUND OF THE INVENTION

Cutting tool assemblies typically include a cutter such as a drill, a tap, a milling cutter etc., a tool holder for securing the cutter, a locking device for locking the tool holder which provides the means by which the locking device grips the tool holder and thereby secures the same. The cutting tool assembly may also include a housing for enclosing the components of the cutting tool assembly and securing them in the desired position. The housing may be in the form of a tool block, a machine spindle, etc.

The locking device has a slot or cavity for receiving the retention knob. The slot has a shape which allows the retention knob to be securely grasped and retained in the desired position to insure precise alignment of the tool holder.

The retention knob commonly accepted in the industry has a cylindrical shaft with a continuous recess circumscribing the outer surface thereof. The recess is comprised of a circular base bound by opposed walls extending upward from the base toward the outer surface of the shaft.

The size of the retention knob including the diameter of the recess is dependent on the size of the shank according to standards in the industry. Relatively large size shanks have correspondingly large size retention knobs wherein the diameter of the recess is generally sufficient to withstand fracture even under severe locking and application forces generated during machining operations. However, smaller shanks (e.g. #20 ANSI standard) having a correspondingly smaller cross-sectional area are more susceptible to fracture along the diameter of the recess. This is because the recess of the retention knob has the smallest cross-sectional area of the entire cutting tool assembly. When the recess fractures, the tool holder separates from the locking device which can result in significant downtime of the machine as well as damage to the tool holder, the cutter, and other components of the cutting tool assembly as well as the workpiece. In addition, retention knobs are often manufactured integral with the tool holder. If the retention knob fails, the tool holder must be discarded which adds significantly to the overall cost of machine tools.

It is therefore an object of the invention to provide a retention knob which has increased strength and is significantly more resistant to fracture than known retention knobs.

It is another object of the invention to provide a retention knob having a greater cross-sectional area for a given sized tool holder than known retention knobs.

It is still another object of the invention to provide a cutting tool assembly employing a retention knob which is less susceptible to fracture, especially those employing relatively small tool holders.

SUMMARY OF THE INVENTION

The present invention is directed to a retention knob and cutting tool assemblies employing the same for reversibly locking a tool holder to a locking device. The retention knob includes a substantially circular shaft mounted to an end of the tool holder. The retention knob has an end which is adapted to be engaged by a locking device along its longitudinal axis.

The retention knob has a pair of opposed recesses. Each recess has a substantially flat base extending substantially perpendicular to the longitudinal axis of the shaft. The recesses also have a pair of opposed walls which extend upwardly from the base to the outer surface of the shaft. One of the walls of each recess is adapted to engage a corresponding wall forming the slot of the locking device when the tool holder and locking device are in operative locking engagement.

The retention knob of the present invention therefore does not have a continuous circular recess as in previous designs. By employing a pair of opposed recesses having flat, rather than circular bases, each recess is separated by opposed sections of the shaft having a diameter exceeding the diameter of the opposed recessed sections. That is, the diameter of the shaft in the region of the non-recessed sections is not reduced as would be the case when the entire circumference is machined to provide a continuous recess as in previous designs. Because less material is removed from the shaft, the strength of the shaft is significantly greater than retention knobs currently employed.

The cutting tool assembly of the present invention includes a tool holder having secured thereto a cutting tool of any type including a drill, a tap, a milling cutter, etc. The retention knob is secured to the opposed end of the toolholder, or preferably formed integral therewith. A locking device is provided which has a slot adapted to receive the retention knob in reverse locking engagement. The slot may be provided with opposed walls forming an opening for receiving the retention knob. Operative engagement of the retention knob and the locking device results from the interaction of one wall of each recess and the walls forming the slot of the tool locking device.

BRIEF DESCRIPTION OF THE DRAWINGS

The following drawings in which like reference characters indicate like parts are illustrative of embodiments of the invention and are not intended to limit the scope of the invention as encompassed by the claims forming part of the application.

DETAILED DESCRIPTION OF THE INVENTION

The retention knob of the present invention provides significantly greater resistance to tensile forces than prior art retention knobs due primarily to a significant increase in the cross-sectional area in the region of the recess of the retention knob.

Figure 1:
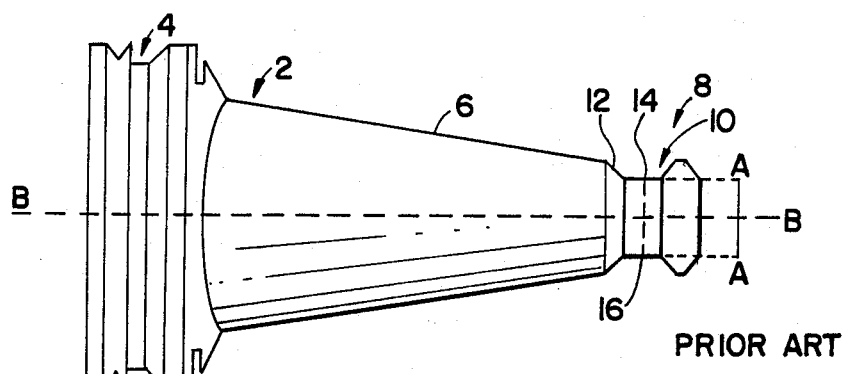
FIG. 1 is a perspective view of a prior art tool holder with a standard retention knob at one end.

Referring to FIG. 1, there is shown a tool holder 2 having a collar 4 and a tapered body 6 with a retention knob 8 representative of prior art devices. The retention knob 8 has a circular recess 10 which is continuous about a shaft 12. The smallest diameter of the shaft 12 is measured from any point 14 along the base of the recess 10 to a diametrically opposed point 16 of the recess 10 as indicated by the line A—A.

Since the length of line A—A is the shortest dimension perpendicular to the longitudinal axis B—B of the body 6, the region of the recess 10 is the most vulnerable to fracture during locking or machining operations.

In accordance with the present invention, the recess is not made continuous about the shaft. Instead there are provided opposed recesses of sufficient dimensions so as to enable the retention knob to be inserted and secured within a complimentary shaped slot in a locking device. The remaining, non-recessed portions have a diameter which is greater than the diameter of the recessed areas. Accordingly, the retention knob of the present invention has a greater mass than that of previous designs and thereby provides significantly greater resistance to fracture.

Figure 2:
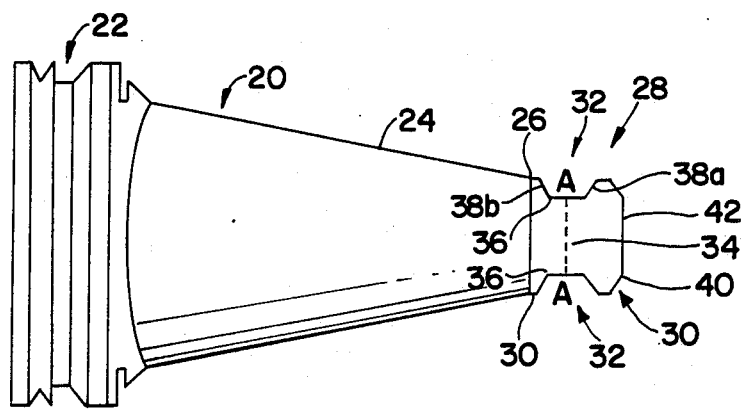
FIG. 2 is a perspective view of a tool holder with the retention knob of the present invention at one end.
Figure 3:
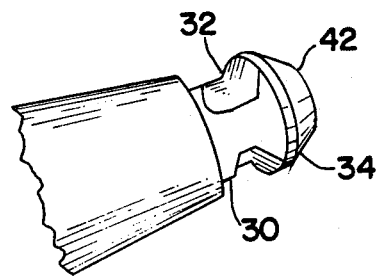
FIG. 3 is a perspective view of the retention knob shown in FIG. 2.
Figure 4:
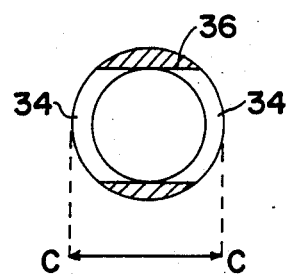
FIG. 4 is a front view of the retention knob of FIG. 2 depicting the respective flat bases of the opposed recesses and the enlarged diameter of the opposed non-recessed portions.

More specifically and referring to FIG. 2-4, there is shown one embodiment of the invention which includes a tool holder 20 having a collar 22 which is adapted to have secured thereto a cutting device (not shown) such as a drill, etc. The manner in which the cutting device and tool holder are secured together is well known in the art.

The tool holder 20 has a body 24, which may be tapered as shown in FIG. 2. The body 24 tapers inwardly from the collar 22 to an opposed end 26 having thereon a retention knob 28. The retention knob 28 may be screwed into the tool holder 20 in a customary manner. For example, the retention knob may be fitted at one end with threads which mate with corresponding grooves in an axial hole in the tool holder 20 at the opposed end 26. However, it is preferred to have the retention knob 28 integral with the opposed end 26 in order to insure precise alignment with the locking device.

The retention knob 28 includes a shaft 30 having opposed recesses 32 therein. The recesses 32 are separated by opposed non-recessed sections 34 of the shaft 30.

The recesses 32 comprise a substantially flat base 36, extending perpendicular to the longitudinal axis of the tool holder 20 and are bounded by opposed walls 38a and 38b extending upwardly from the base 36. The wall 38a is adapted to engage a corresponding wall of the locking device to provide locking engagement between the tool holder 20 and the locking device as described hereinafter.

The retention knob 28 also includes a forward end 40 which is adapted to be positioned within a corresponding slot of the locking device. The forward end comprises the wall 38a and a front face 42.

The diameter of the retention knob 28 measured from the base 36 of one recess 32 to the base 36 of the opposed recess 32 as shown by line A—A in FIG. 2 is essentially the same as that for conventional retention knobs of the same ANSI standard as described previously in connection with prior art FIG. 1. On the other hand, the diameter of the retention knob 28 measured along the line C—C between the opposed non-recessed shaft sections 34 (as best seen in FIG. 4) is significantly greater than the diameter between opposed recessed areas of the conventional retention knob. It is this increase in the diameter and consequential increase in the cross-sectional area which renders the present retention knob 28 more resistant to fracture when the cutting tool is subjected to the severe forces associated with machining operations.

The wall 38a of the retention knob 28 extends upwardly from the base 36 of the recess 32 at angle alpha (see FIG. 6) sufficient to insure locking engagement between the retention knob 28 and the locking device. The angle may be 0° but is preferably about 30° to 60°, most preferably about 45°.

The dimensions of the tool holder 20 are generally established by industry standards with respect to both the length of the body 24 and the degree of taper, if any. For example, tapered bodies of the type shown in FIG. 2 have a 3.5 inch taper per foot of length. Retention knobs employed on such tapered tool holders are scaled according to the size of the tool holder. The retention knob 28 of the present invention may be employed on any size tool holder and are especially effective for relatively small tool holders having corresponding small retention knobs. This is because the smaller the retention knob the greater risk of fracture. As a result, the greater cross-sectional area of the present retention knob, results in greater strength and resistance to fracture.

Figure 5:
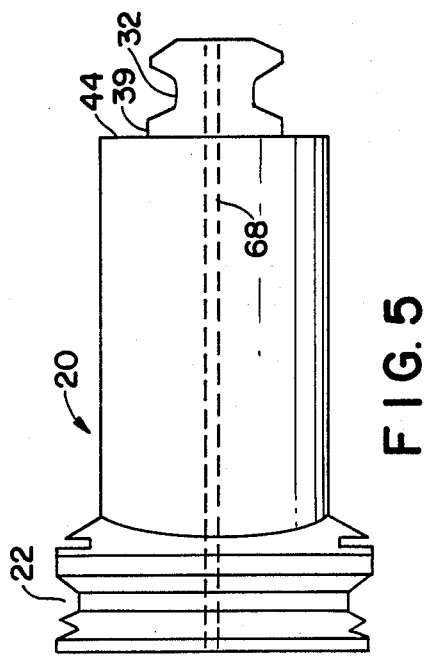
FIG. 5 is a perspective view of another embodiment of a tool holder with the retention knob of the present invention at one end.

The retention knob 28 of the present invention may be employed on any shape tool holder including those having a non-tapered body 24 of the type shown in FIG. 5. More specifically, the opposed end 26 of the tool holder 20 has a wall 44, a portion of which has attached thereto the retention knob 28. As with tapered tool holders the size of the retention knob 28 is generally coordinated with the size of the toolholder 20 in accordance with industry standards.

Figure 6:
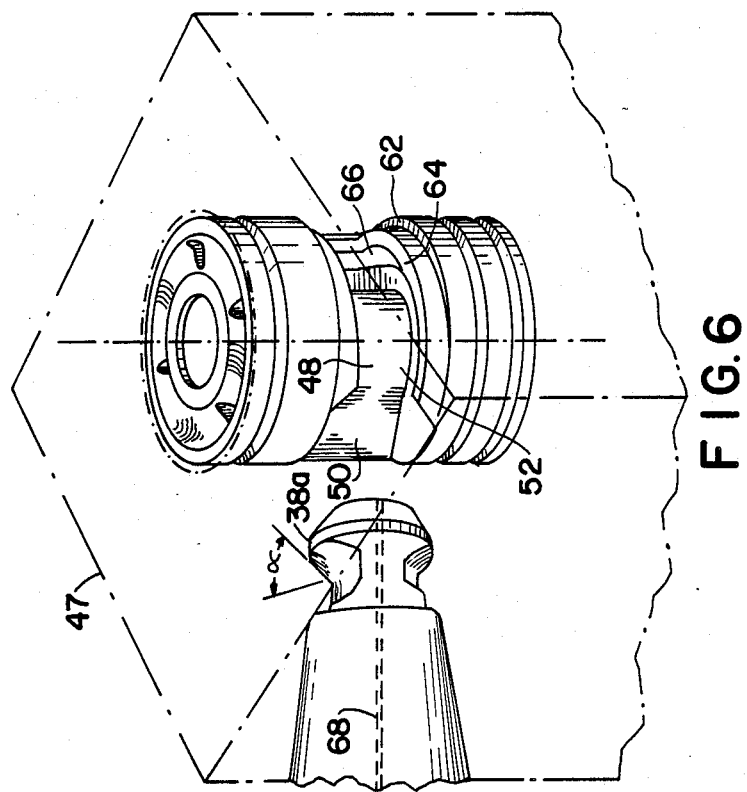
FIG. 6 is a perspective view of a tool holder with the retention knob of the present invention is position for insertion into a locking device.
Figure 7:
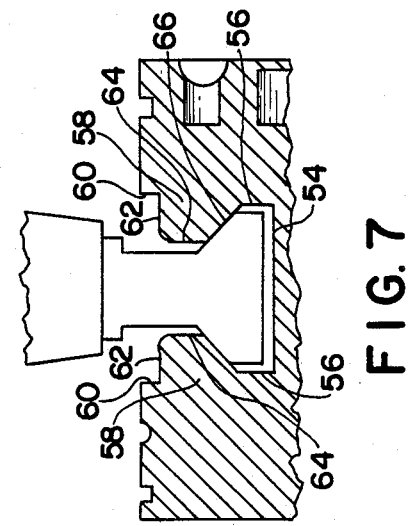
FIG. 7 is a partial cross-sectional view of the locking device shown in FIG. 6 taken along line D—D with the retention knob secured in the locking device.

The retention knob 28 may be inserted into any conventional locking device in accordance with the objects of the invention. As shown in FIGS. 6 and 7, a cylindrical locking device 46 of the type described in Kelm, U.S. Pat. No. 4,723,878 is utilized for illustrative purposes. Complete details of the cylindrical locking device 46 are provided in the '878 patent which is incorporated herein by reference.

The locking device 46 is typically secured in a tool block 47 or similar device and includes an eccentric slot 48 having a sufficient depth and height to accommodate the retention knob 28. The slot 48 is constructed about the periphery of the locking device 46 in two distinct zones, a loading zone 50 and a helical zone 52. The slot 48 includes an inner wall 54, a pair of opposing side walls 56, a pair of opposing shoulders 58 and a pair of outer shoulders 60. Each of the shoulders 58 comprises a top surface 62, an essentially vertical wall 64 and a tapered wall 66 extending downwardly and outwardly from the top surface 62 to the side wall 56. Further details of the locking device 46 are provided in the U.S. Pat. No. 4,723,878.

The retention knob 28 is inserted into the loading zone 50 and then moved laterally to the right as shown in FIG. 6 to effect locking engagement as best seen in FIG. 7. The angular mating of the wall 38a of the retention knob 28 to the tapered walls 66 of the eccentric slot 48 provides area contact between the locking device 46 and the retention knob 28 for drawing in and securing the tool holder 20.

When the retention knob 28 is secured in the eccentric slot 48 by the pressing engagement of the walls 38a of the retention knob 28 against the corresponding tapered wall 66 of their locking device 46 best shown in FIG. 7.

The tool holder 20 may be provided with a customary machine fluid passageway 68 which extends substantially along the longitudinal axis of the tool holder 20 and the shaft 30 of the retention knob 28. A machine fluid such as a coolant and/or lubricant travels through the passageway 68 from a source (not shown) to the cutting tool (not shown) in a conventional manner.

As previously indicated, the cross-sectional area of the retention knob 28 of the present invention is significantly greater than the cross-sectional are of the continuous recess of conventional retention knobs and thereby provides significantly greater resistance to fracture.

More specifically #20 industry standard tapered tool holders having a conventional, continuous recess retention knob design was subjected to stress tests in a locking device of the type described in U.S. Pat. No. 4,723,878. One of the tool holders was provided with a machine fluid passageway extending through the retention knob and the other of the comparative tool holders did not have a fluid passageway. Each of the tool holders was exposed to a measured stepwise increase in tensile force until the retention knob fractured.

A #20 tapered tool holder having a retention knob in accordance with the present invention without a fluid passageway was tested in the same manner as above and the results are shown in Table 1.

TABLE 1

| Size of Tool Holder | Retention Knob Design | Torque LB/IN At Fracture |
| --- | --- | --- |
| #20 | Conventional - with fluid passage | 800 |
| #20 | Conventional - without fluid passage | 1050 |
| #20 | Present invention - Without fluid passage | 1320* |

*Retention knob did not fracture. Tool holder fractured. Mathematical computation of expected torque needed to fracture the retention knob = 1675 lb/in.

Computations were made based on the above results to determine the resistance to fracture for #30, #40, #45 and #50 industry standard tool shanks by employing the corresponding sized retention knobs of the present invention. The results are shown in Table 2.

TABLE 2

| Size of Tool Holder | Retention Knob Design - No Fluid Passageway | Relative Resistance to Fracture |
| --- | --- | --- |
| 20 | Conventional | 1.00 |
| 20 | Present invention | 1.66 |
| 30 | Conventional | 1.00 |
| 30 | Present invention | 1.66 |

TABLE 2-continued

| Size of Tool Holder | Retention Knob Design - No Fluid Passageway | Relative Resistance to Fracture |
| --- | --- | --- |
| 40 | Conventional | 1.00 |
| 40 | Present invention | 1.66 |
| 45 | Conventional | 1.00 |
| 45 | Present invention | 1.65 |
| 50 | Conventional | 1.00 |
| 50 | Present invention | 1.44 |

In accordance, with Table 2, a #30 tool holder having the retention knob of the present invention would be expected to have a 66% greater resistance to fracture than the same size tool holder with a conventional retention knob.

What we claim is:

1. A combination of a tool adaptor and a clamping device for releasably securing the tool adaptor to a clamp block, said combination comprising:
   (a) a tool adaptor having one end adapted to secure a cutting tool and an opposed end adapted to be reversibly received by said clamping device through a retention knob thereby locking the tool adaptor to the clamping device;
   (b) said retention knob comprising:
      (1) a substantially circular shaft having a first end connected to the tool adaptor and an opposed end adapted to engage the clamping device along the longitudinal axis of the shaft; and
      (2) a pair of opposed recesses in the shaft separated by non-recessed portions, each recess having a substantially flat base extending substantially parallel to the longitudinal axis of the shaft and having a pair of opposed walls extending upward from the base to the outer surface of the shaft; and
   (c) a clamping device comprising a generally cylindrical member having an eccentric slot formed about the periphery of said member and including means for receiving said retention knob and means defining a corresponding wall for engaging the retention knob in said cylindrical member by rotation of said cylindrical member and means for rotating said cylindrical member, whereby the retention knob and thereby the tool adaptor are drawn into and secured within the clamping device.

2. The combination of claim 1, wherein the wall of each recess adapted to engage the corresponding wall in the clamping device extends upwardly from the base at an angle of up to 90°.

3. The combination of claim 1, wherein the wall of each recess adapted to engage the corresponding wall in the clamping device is angled about 45° from the base.

4. The combination of claim 1, wherein the first end of the shaft is integrally connected to the tool adaptor.

5. The combination of claim 1, further comprising a passageway within the shaft extending parallel to the longitudinal axis of the shaft, said passageway adapted to allow a machine fluid to pass therethrough.

6. The combination of claim 1, wherein the clamping device has a bore adapted to receive said retention knob, wherein the retention knob is inserted in said bore to a point where the retention knob engages the eccentric slot in said cylindrical member and wherein said cylindrical member is rotated to draw in and secure said retention knob within the bore of the clamping device.

7. The combination of claim 1, wherein said means for receiving said retention knob comprises a loading zone and said means for engaging the retention knob comprises a helical zone.

8. The combination of claim 7, wherein said helical zone comprises an arc angle between 30° and 360°, through which the eccentric slot radially advances toward the axis of said cylindrical member.

9. The combination of claim 7, wherein said retention knob includes a front face and said slot comprises a flat wall which faces said front face.

10. The combination of claim 8, wherein the eccentric slot radially advances toward the axis of said cylindrical member at a fixed rate.

11. The combination of claim 7, wherein said helical zone comprises an arc angle which is preferably between 30° and 260°.

* * * * *